J. Heiden,
Fifth Wheel.
No. 86,397. Patented Feb. 2, 1869.

Witnesses
Inventor
J. Heiden

Attorneys

JOHN HEIDEN, OF NEW YORK, N. Y.

Letters Patent No. 86,397, dated February 2, 1869.

FRONT PLATFORM FOR CARRIAGES.

The Schedule referred to in these Letters Patent and making part of the same.

*To all whom it may concern:*

Be it known that I, JOHN HEIDEN, of the city, county, and State of New York, have invented a new and improved Front Platform for Carriages, &c.; and I do hereby declare that the following is a full, clear, and exact description thereof, which will enable those skilled in the art to make and use the same, reference being had to the accompanying drawings, forming part of this specification.

This invention relates to improvements in the construction of the front gear of carriages and other vehicles, having for its object to provide an arrangement whereby the same may be made lighter, cheaper, and stronger than as at present constructed.

In the accompanying drawings—

Similar letters of reference indicate corresponding parts.

Figure 1:
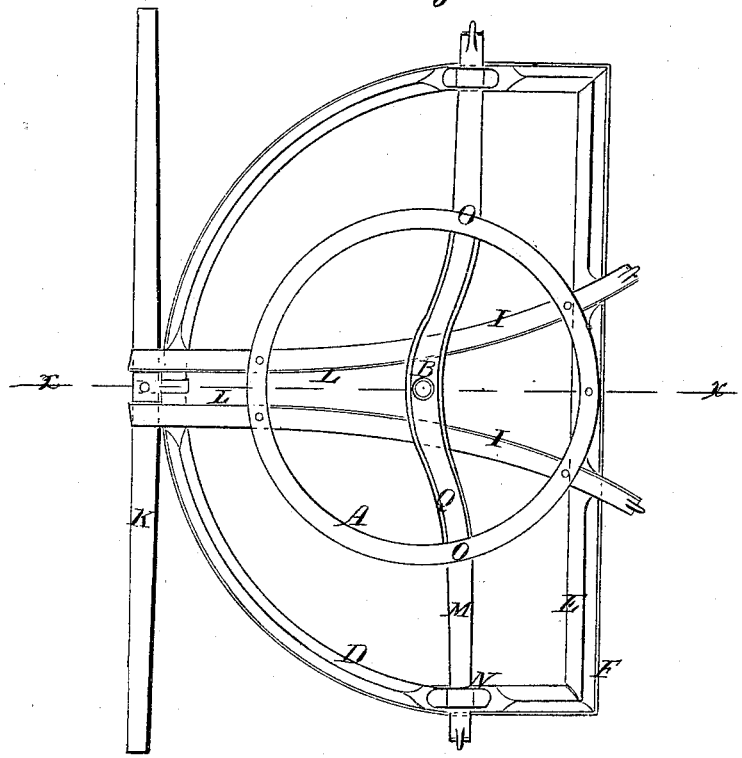
Figure 1 represents a plan view of my improved arrangement.
Figure 2:
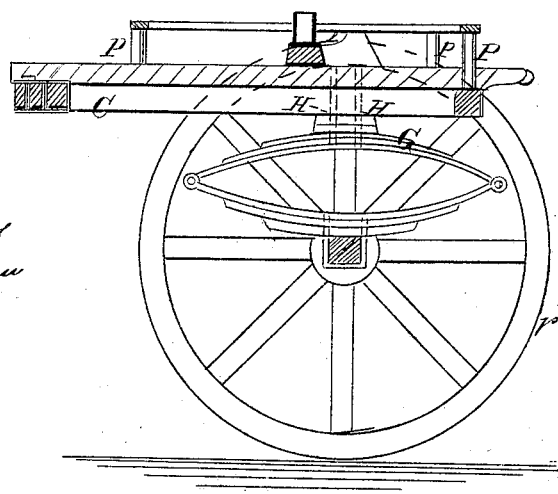
Figure 2 represents a longitudinal sectional elevation of the same taken on the line $x\,x$ of fig. 1.

For the support of the fifth-wheel A, and the central bearing B, I provide the platform C, composed of a semicircular bow, D, and the transverse bar E, united at the two ends of the said bow, and secured thereto by tenons and mortises, or by any other suitable means, and encircle the whole by a tire or band, F, to be shrunk on in the same manner as the wheels are banded.

The said platform D E, so constructed, is connected to the springs G by the clips H, and supported thereon, and, in its turn, supports the curved ferchal bars I, connected, at their rear ends, to the top of the bar E, or they may be otherwise constructed equidistant from the centre of the same, and to the bow D, near the centre of the front, and preferably extending forward of the same, the breadth of the draw-bar or doubletree K.

The said bars I may be strapped or banded on their curved sides, as represented at L, and instead of making the said bars of curved form, they may be made straight, and applied angularly to the line $x\,x$.

The said platform D E also supports the transverse bar M, secured thereto, above the bearings on the springs, by clips N, and curved upward sufficiently near its centre to rise above the bars I, and pass over them. It is also curved sufficiently forward to form the support of the centre bearing, at the centre of the fifthwheel A, which is secured by bolts to the said transverse bar at O, and to the bars I and E by studs P. It is also connected to the bars I by bolts, where it passes over them.

The said transverse bar M may also be strengthened by a plate on the bottom, and by the transom-plate Q on the top.

By this arrangement I am enabled to provide a very strong and light frame-work for the front gear of carriages and other vehicles, with very simple and cheap workmanship, dispensing entirely with the iron stays and other iron-work commonly used, which require laborious skilled forging and accurate shaping, and involving a materially greater weight of metal.

The platform D E, when put together, and banded as described, possesses great strength alone, and when further strengthened by the bars I and M, constitutes a framing of very much greater strength than the common devices, and it may be correspondingly reduced in weight.

The said bars M and I may, instead of being arranged as herein described, be arranged in any preferred manner.

For light carriages, I propose, in some cases, to dispense with the band F, as when the bow D and bar E are made of hard and tough wood, the platform will be of sufficient strength without the iron, and in such case, instead of connecting the ends of the bow and the bar, as I have described, I prefer to have the bar E pass over the ends of the bow, and be secured thereto by bolts or clips, and allow the ends of each to project sufficiently to admit of finishing them ornamentally, as by carvings, scrolls, or other designs thereon.

In some cases, especially for stages, when the body is supported on an arrangement of three springs, as well as in other cases, the position of the platform D E may be reversed, and the bar F placed in front, for the connection of the draw-bar K, two of the said springs being connected by shackles to the bar E, and a cross-spring connected to the centre of the rear part of the platform by clips.

I claim as new, and desire to secure by Letters Patent—

The improved front platform for carriages and other vehicles, composed of the bow D and transverse bar E, united to the ends of the said bow D, with the hoop or band F, and the circle O, and bars I I and M, all arranged and combined substantially as and for the purpose specified.

J. HEIDEN.

Witnesses:
 FRANK BLOCKLEY,
 ALEX. F. ROBERTS.